United States Patent
Mizutani

(10) Patent No.: US 12,323,700 B2
(45) Date of Patent: Jun. 3, 2025

(54) IMAGE PICKUP APPARATUS, CONTROL METHOD, CONTROL APPARATUS, AND STORAGE MEDIUM

(71) Applicant: CANON KABUSHIKI KAISHA, Tokyo (JP)

(72) Inventor: Shoma Mizutani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 257 days.

(21) Appl. No.: 18/192,014

(22) Filed: Mar. 29, 2023

(65) Prior Publication Data

US 2023/0328370 A1 Oct. 12, 2023

(30) Foreign Application Priority Data

Apr. 7, 2022 (JP) ................. 2022-064169

(51) Int. Cl.
*H04N 23/60* (2023.01)
*G05D 19/02* (2006.01)

(52) U.S. Cl.
CPC .......... *H04N 23/665* (2023.01); *G05D 19/02* (2013.01); *H04N 23/64* (2023.01)

(58) Field of Classification Search
CPC .................................................. H04N 23/665
See application file for complete search history.

(56) References Cited

U.S. PATENT DOCUMENTS

| | | | | |
|---|---|---|---|---|
| 11,936,976 | B2* | 3/2024 | Nakamura | H04N 23/635 |
| 2014/0359438 | A1* | 12/2014 | Matsuki | G02B 7/36 |
| | | | | 715/702 |
| 2015/0334292 | A1* | 11/2015 | Tartz | H04N 23/61 |
| | | | | 348/222.1 |
| 2019/0356834 | A1* | 11/2019 | Yana | H04N 23/73 |
| 2020/0322517 | A1* | 10/2020 | Tani | H04N 23/6812 |
| 2021/0271325 | A1* | 9/2021 | Seo | H04N 23/631 |
| 2022/0070358 | A1* | 3/2022 | Fujii | H03K 17/965 |
| 2023/0059156 | A1* | 2/2023 | Hasegawa | A61B 6/548 |

FOREIGN PATENT DOCUMENTS

JP 4649835 B2 3/2011
JP 2019-191435 A 10/2019

* cited by examiner

*Primary Examiner* — Cynthia Segura
(74) *Attorney, Agent, or Firm* — Cowan, Liebowitz & Latman, P.C.

(57) ABSTRACT

An image pickup apparatus includes an image sensor configured to receive light and accumulate charges, a vibration generator configured to generate vibration, an image sensor control unit configured to cause the image sensor to perform an electronic front curtain operation to start accumulating the charges, and an electronic rear curtain operation to finish accumulating the charges, and a vibration control unit configured to control the vibration generator. The vibration control unit causes the vibration generator to generate first vibration before accumulating the charges is started and second vibration after the accumulating the charges are finished.

14 Claims, 5 Drawing Sheets

IMAGE PICKUP APPARATUS, CONTROL METHOD, CONTROL APPARATUS, AND STORAGE MEDIUM

BACKGROUND

Technical Field

One of the aspects of the disclosure relates to an image pickup apparatus such as a digital camera having a vibration device.

Description of the Related Art

Some image pickup apparatuses have an electronic shutter that realizes a shutter function by controlling an image sensor instead of a mechanical shutter such as a focal plane shutter. However, the electronic shutter does not generate any operating noise unlike the mechanical shutter, and it is thus difficult for the user to recognize the imaging timing. Japanese Patent No. 4649835 discloses an image pickup apparatus that can notify the user of the operation of the electronic shutter by vibration by causing a vibration device to vibrate simultaneously with the operation of the shutter button by the user. Japanese Patent No. 4649835 also teaches to weaken the vibration intensity such that vibration generated by a vibration device does not affect imaging during long exposure, in which camera shake is likely to occur. Japanese Patent Laid-Open No. 2019-191435 discloses an image pickup apparatus configured to shift the vibration generating timing from the exposure timing so that the vibration generated by the vibration device does not affect imaging.

However, in the image pickup apparatuses disclosed in Japanese Patent No. 4649835 and Japanese Patent Laid-Open No. 2019-191435, it is difficult for the user to recognize the start and end of the long exposure (electric charge accumulation). In a case where an image pickup apparatus having a mechanical shutter performs long exposure, a front curtain runs and vibrates at the exposure start timing, and then a rear curtain runs and vibrates at the exposure end timing. That is, two vibrations occur at the start and end of the exposure. Thereby, the user can recognize the start and end of the long exposure. On the other hand, as in the image pickup apparatuses disclosed in Japanese Patent No. 4649835 and Japanese Patent Laid-Open No. 2019-191435, in a case where the vibration from the vibration device occurs only once regardless of the shutter speed, only one of the start and end of the long exposure can be recognized.

SUMMARY

One of the aspects of the embodiment provides an image pickup apparatus that includes an electronic shutter having an electronic front curtain operation and an electronic rear curtain operation, a control method, a control apparatus, and a storage medium, each of which enables a user to recognize the start and end of long exposure by the vibration of a vibration device.

An image pickup apparatus according to one aspect of the disclosure includes an image sensor configured to receive light and accumulate charges, a vibration generator configured to generate vibration, at least one processor, and a memory coupled to the at least one processor. The memory has instructions that, when executed by the processor, configure the processor to operate as an image sensor control unit configured to cause the image sensor to perform an electronic front curtain operation to start accumulating the charges, and an electronic rear curtain operation to finish accumulating the charges, and a vibration control unit configured to control the vibration generator. The vibration control unit causes the vibration generator to generate first vibration before accumulating the charges is started and second vibration after the accumulating the charges are finished.

A control method according to another aspect of the disclosure for an image pickup apparatus that includes an image sensor configured to receive light and accumulate charges, and a vibration generator configured to generate vibration includes the steps of causing the image sensor to perform an electronic front curtain operation to start accumulating the charges, and to perform an electronic rear curtain operation to finish accumulating the charges, and causing the vibration generator to generate first vibration before accumulating the charges is started and second vibration after the accumulating the charges are finished. A non-transitory computer-readable storage medium storing a program that causes a computer to execute the above control method also constitutes another aspect of the disclosure.

A control apparatus according to another aspect of the disclosure for an image pickup apparatus that includes an image sensor configured to perform an electronic front curtain operation to start accumulating the charges, and an electronic rear curtain operation to finish accumulating the charges, and a vibration generator configured to generate vibration includes at least one processor, and a memory coupled to the at least one processor. The memory has instructions that, when executed by the processor, perform operations as a vibration control unit configured to control the vibration generator. The vibration control unit causes the vibration generator to generate first vibration before the image sensor starts accumulating the charges and second vibration after the image sensor finishes accumulating the charges.

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

DESCRIPTION OF THE EMBODIMENTS

Referring now to the accompanying drawings, a description will be given of embodiments according to the disclosure.

First Embodiment

Figure 1A:
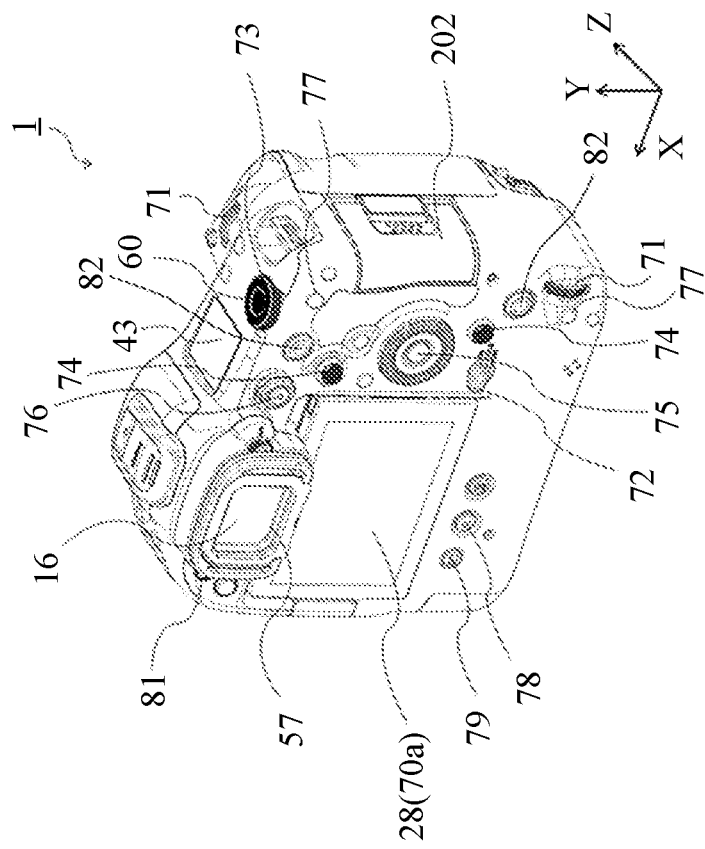
FIGS. 1A and 1B are external perspective views of an image pickup apparatus according to one embodiment.
Figure 1B:
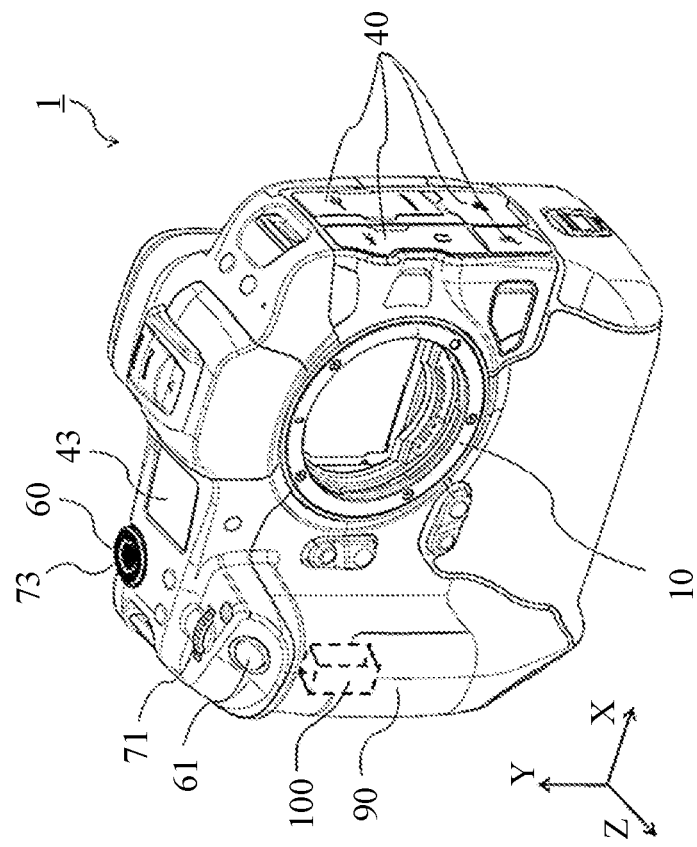
Figure 2:
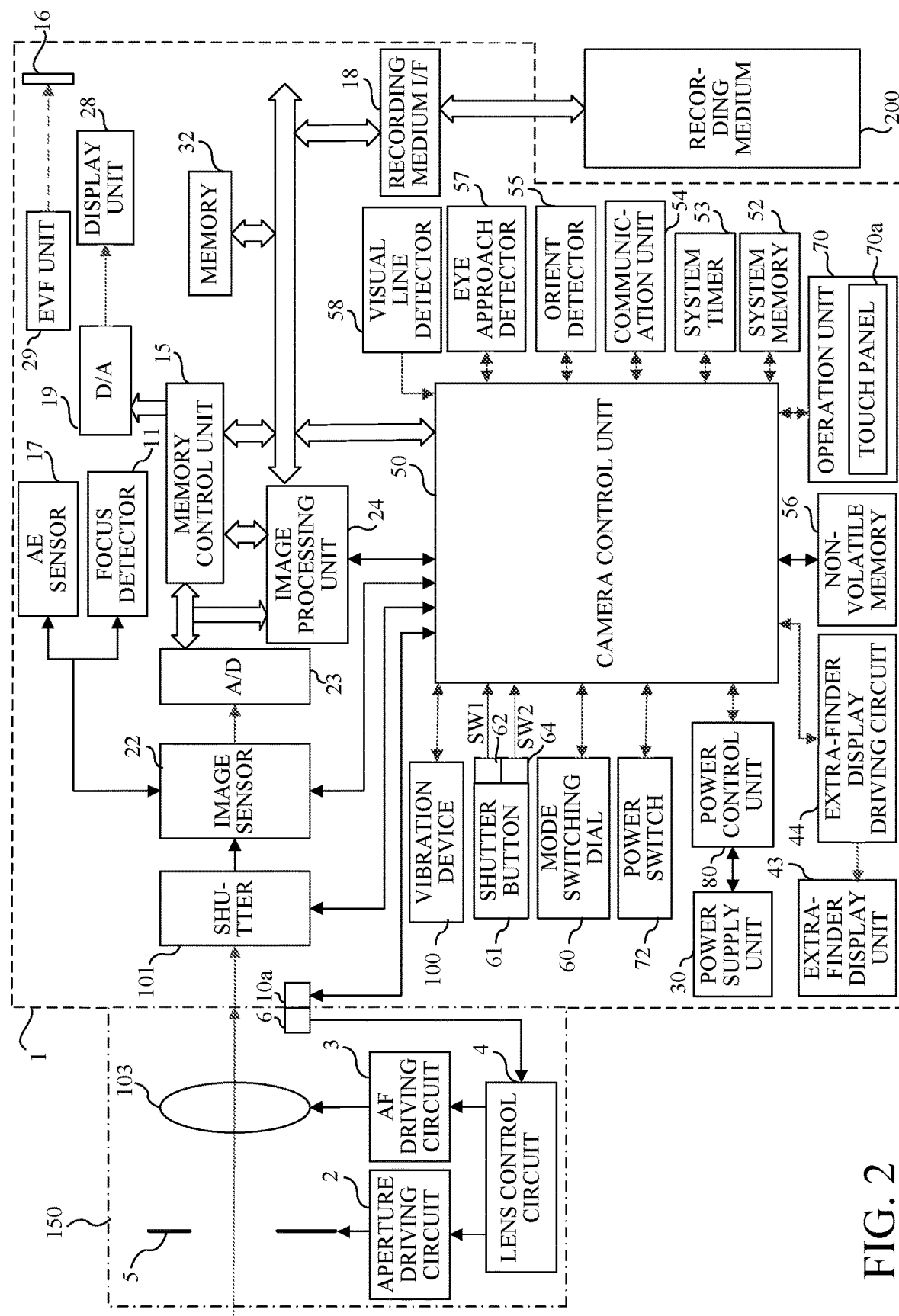
FIG. 2 is a block diagram illustrating an electrical configuration of the image pickup apparatus according to this embodiment.

FIGS. 1A and 1B illustrate an external appearance of an image pickup apparatus (digital camera: simply referred to as a camera hereinafter) 1 according to one embodiment. FIG. 1A illustrates the camera 1 viewed obliquely from the front, and FIG. 1B illustrates the camera 1 viewed obliquely from the back. FIG. 2 illustrates the electrical configuration of a camera system that includes the camera 1 and an interchangeable lens 150 attached to the camera 1.

A display unit 28 is a display unit material provided on the back of the camera 1, and can display a live-view image, a recorded captured image, and various information. The display unit 28 has a function as a touch panel 70a and can detect touch operations on a display surface. An extra-finder display unit 43 is a display unit material provided on a top surface of the camera 1, and can display various setting values such as a shutter speed and an F-number (aperture value).

The camera 1 has a front grip portion 90, and the user grips the front grip portion 90 and captures an image. A vibration device 100 serving as a vibration generator is provided inside the front grip portion 90. The configuration and operation of the vibration device 100 will be described below.

A shutter button 61 is disposed on the upper part of the front grip portion 90. In a case where the user half-presses the shutter button 61 (to turn on a SW1 signal), imaging preparation operations such as auto exposure (AE) and autofocus (AF) are started. In a case where the user fully presses the shutter button 61 (to turn on a SW2 signal), an imaging operation that acquires an image for recording is started.

A power switch 72 is an operation member that can switch powering on and off of the camera 1. A mode switching dial 60 is an operation member for switching imaging modes. The imaging mode includes a shutter speed priority mode, an F-number priority mode, a moving image mode, and the like.

A main electronic dial 71 and a sub electronic dial 73 are rotary operation members, and, when rotated by the user, can change set values such as the shutter speed and the F-number. A SET button 75 is operated mainly for determining a selection item. A moving image button 76 is used to instruct the start and stop of moving image capturing for recording. An AE lock button 77 can lock the exposure when operated during imaging standby. An enlarging button 78 is operated to switch between turning on and off of image enlargement during imaging or playback of a captured image. In a case where the enlargement mode is turned on and the main electronic dial 71 is operated, the enlargement magnification can be changed. A playback button 79 is operated to instruct playback of a recorded captured image.

A menu button 81 is operated to switch turning on and off the display of a menu screen that enables various settings on the display unit 28. The user can intuitively perform various settings by operating a multi-directional key 74, the SET button 75, the touch panel 70a, etc. according to the menu screen. The multi-directional key 74 is an operation member that can provide totally eight directional instructions including up, down, left, right, and oblique directions therebetween, and can provide an operation according to the direction in which the tiltable multi-directional key 74 is tilted.

An EVF unit 29 is provided inside an eyepiece unit 16 and can display a live-view image during imaging. By looking into the eyepiece unit 16, the user can confirm an object and composition in a state in which external light is shielded. The EVF unit 29 can display a menu screen and a captured image similarly to the display unit 28. An eye approach detector 57 is a sensor that detects whether or not the eye of the user is close to the eyepiece unit 16.

Connectors (not illustrated) for electrically connecting an external device and the camera 1 are arranged on the side of the camera 1 and protected by a terminal cover 40. A media slot cover 202 is a lid member that covers a slot that stores a recording medium 200. A user can open the media slot cover 202 to insert or remove the recording medium 200 such as a memory card.

A lens mount 10 is provided on the front surface of the camera 1. The interchangeable lens 150 illustrated in FIG. 2 is attachable to and detachable from the lens mount 10. The lens mount 10 has a camera terminal portion 10a including a plurality of electronic contacts, through which communication between the camera 1 and the interchangeable lens 150 and power supply from the camera 1 to the interchangeable lens 150 are performed.

The interchangeable lens 150 has an imaging optical system that includes a lens 103 and an aperture stop (diaphragm) 5. While FIG. 2 illustrates a single lens 103, the actual imaging optical system includes a plurality of lenses.

A lens terminal unit 6 including a plurality of electronic terminals enables communication between the camera 1 and the interchangeable lens 150 and power supply from the camera 1 to the interchangeable lens 150 via the camera terminal portion 10a of the lens mount 10. The interchangeable lens 150 includes a lens control circuit 4. The lens control circuit 4 controls the aperture stop 5 through an aperture driving circuit 2 and controls a focus lens included in the imaging optical system through an AF driving circuit 3 according to commands from a camera control unit (control apparatus) 50 in the camera 1.

In the camera 1, a mechanical shutter 101 is a focal plane shutter having a light shielding curtain consisting of a front curtain and a rear curtain. The mechanical shutter 101 is disposed in front of the image sensor (IMG SNSR) 22, and the camera control unit 50 controls the exposure time of the image sensor 22 by controlling the running timing of the light shielding curtain.

The image sensor 22 is a photoelectric conversion element, such as a CCD sensor or a CMOS sensor, which receives light (an object image as an optical image) from the imaging optical system and accumulates electric charges for each pixel to generate an electric signal. The image sensor 22 has an electronic shutter function (simply referred to as electronic shutter hereinafter). The electronic shutter controls the charge accumulation start (charge reset) timing for each pixel line of the image sensor 22 to perform an electronic front curtain operation, and controls the charge readout timing for each pixel line to perform an electronic rear curtain operation. Thus, the electronic shutter controls the exposure (charge accumulation) period of the image sensor 22. Using the electronic shutter can realize silent imaging without generating operating noise, which can be caused by operating the mechanical shutter 101. The electronic shutter in the image sensor 22 is controlled by the camera control unit 50 that serves as an image sensor control unit.

An AE sensor 17 acquires luminance information of an object image from imaging data obtained through the image sensor 22. A focus detector 11 detects defocus amount information of the imaging optical system from imaging data. The camera control unit 50 controls the imaging preparation operation such as AE processing and AF processing based on these pieces of information.

An A/D converter 23 converts an analog imaging signal output from the image sensor 22 into a digital imaging signal (imaging data). An image processing unit 24 performs pixel interpolation, resizing processing, color conversion processing, etc. for the imaging data from the A/D converter 23 or the imaging data from a memory control unit 15 and generates image data. The image data are recorded in a memory 32 directly or via a memory control unit 15.

AD/A converter 19 converts image data for display stored in the memory 32 into an analog image signal. The display unit 28 and EVF unit 29 display an image corresponding to an analog image signal. The extra-finder display unit 43 is driven by an extra-finder display unit driving circuit 44 and displays the set value such as the shutter speed and the F-number.

A nonvolatile memory (NVM) 56 is an electrically erasable/recordable memory, such as an EEPROM. The nonvolatile memory 56 stores constants, programs, etc. for operations of the camera control unit 50. The camera control unit 50 includes at least one processor or circuit, and performs overall control for the camera 1 by executing programs recorded in the nonvolatile memory 56. The system memory 52 decompresses constants and variables for operation of the camera control unit 50, programs read out of the nonvolatile memory 56, and the like. A system timer 53 counts the time for various controls and the time of the built-in clock.

The mode switching dial 60, the first shutter switch (SW1) 62, the second shutter switch (SW2) 64, and an operation unit 70 receive the operation of the user and input various instructions to the camera control unit 50.

A power control unit 80 includes a battery detecting circuit, a DC-DC converter, a switching circuit for switching blocks to be energized, etc., and detects whether or not a battery is installed, a type of the installed battery, and the remaining battery level. The power control unit 80 also controls the DC-DC converter based on the detection results and instructions from the camera control unit 50, and supplies necessary voltage to each unit including the recording medium 200 for a necessary period.

A power supply unit (PW) 30 is a primary battery such as an alkaline battery or a lithium battery, a secondary battery such as a NiCd battery, a NiMH battery or a Li battery, or an AC adapter.

The recording medium 200 includes a semiconductor memory, a magnetic disk, or the like, and records captured images. A recording medium interface (I/F) 18 is an interface with the recording medium 200.

A communication unit (COMM) 54 can transmit and receive video signals and audio signals to and from an external device connected by a wired cable. The communication unit 54 can also perform wireless communication with an external device using the wireless communication technology such as the wireless LAN or Bluetooth (registered trademark).

An orientation detector 55 detects the orientation of the camera 1 using an acceleration sensor, a gyro sensor, or the like. Based on the orientation detected by the orientation detector 55, the camera control unit 50 can determine whether the image was captured by the camera 1 in the horizontal orientation or the vertical orientation. Camera shake such as manual shake can also be detected based on the detected orientation change. Moving part of the imaging optical system or the image sensor 22 in a direction orthogonal to the optical axis according to the detected camera shake, image blur caused by the camera shake can be corrected.

Figure 3:
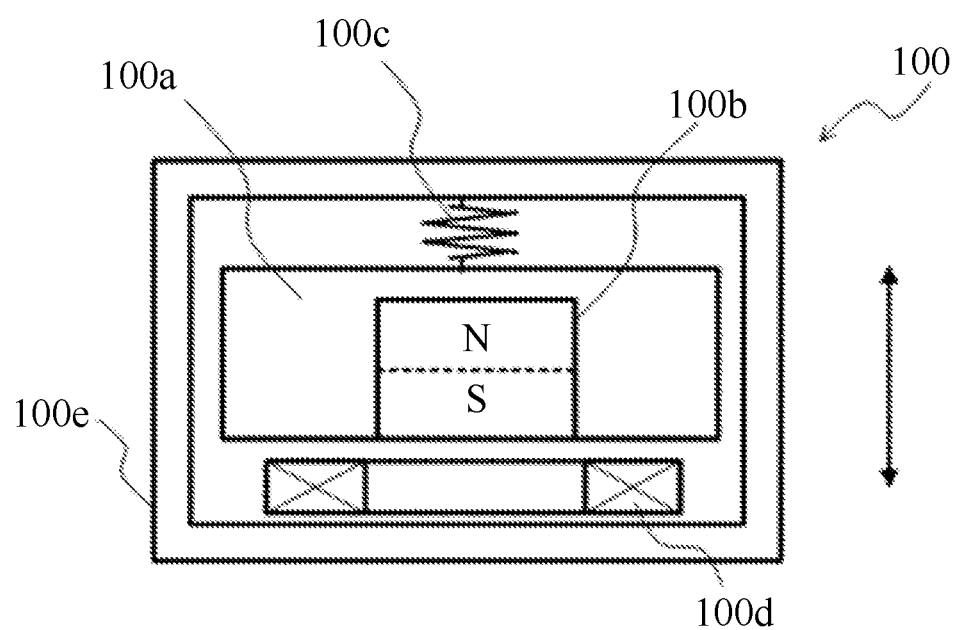
FIG. 3 illustrates the configuration of a vibration device according to this embodiment.

FIG. 3 illustrates the configuration of the vibration device 100. In this embodiment, in a case where silent imaging is made by the electronic shutter, the vibration device 100 is caused to vibrate so that the user can recognize that the image sensor 22 has been exposed. The vibration device 100 is controlled by the camera control unit 50 that serves as a vibration control unit.

The vibration device 100 illustrated in FIG. 3 is a linear actuator (LRA) type vibration device. The LRA type vibration device 100 includes a vibrator 100a, a magnet 100b, a spring 100c, a coil 100d, and a base 100e. The vibrator 100a holds magnet 100b and is movably coupled to the base 100e by the spring 100c. The coil 100d is disposed near the magnet 100b and electrically connected to a circuit board. In a case where the coil 100d is energized, an electromagnetic force is generated, and an attractive force or repulsive force between the electromagnetic force and the magnet 100b reciprocates the vibrator 100a in an arrow direction in FIG. 3, thereby causing the vibration device 100 to vibrate. Vibration parameters such as vibration intensity (amplitude, acceleration) and frequency can be changed by controlling the current flowing through the coil 100d.

The vibration device 100 may use a device other than the LRA type, such as a device using a piezoelectric element or a DC motor.

Figure 4:
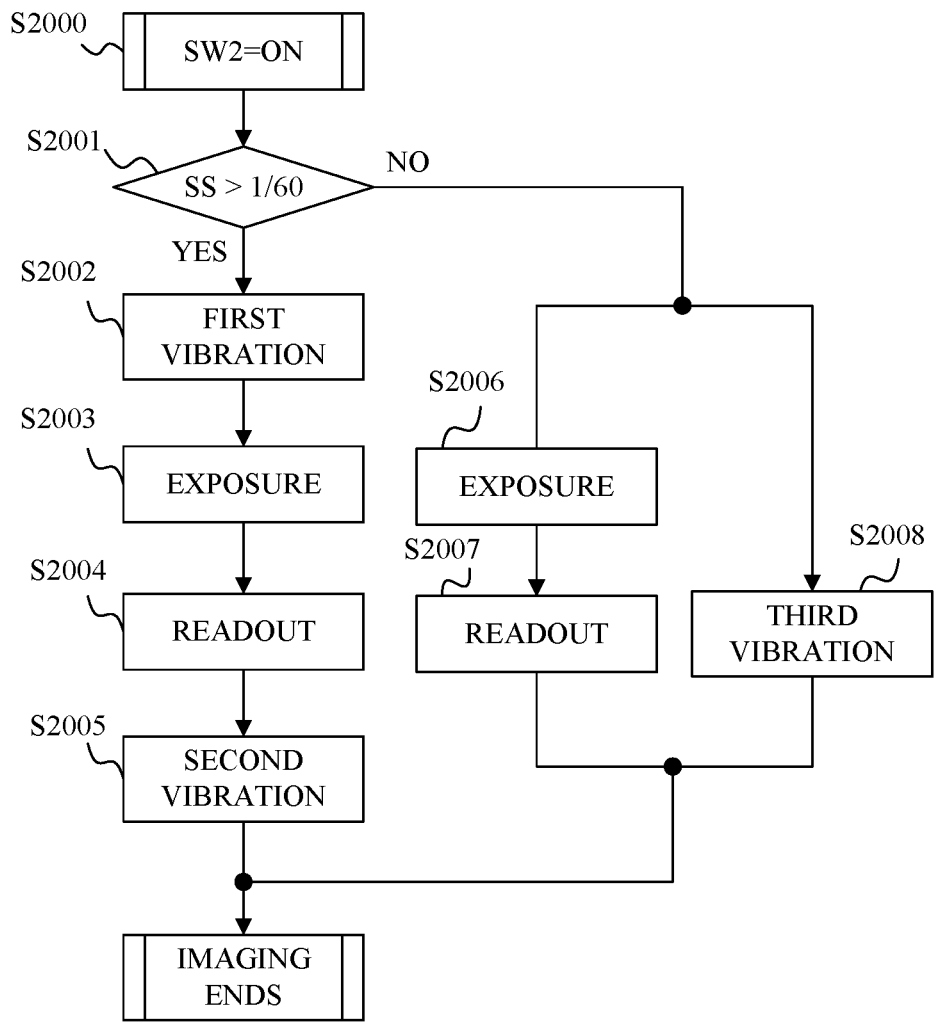
FIG. 4 is a flowchart illustrating imaging processing according to this embodiment.

FIG. 4 illustrates imaging processing (control method) executed by the camera control unit (control unit) 50 as a computer according to a program. A description will now be given of the processing after the shutter button 61 is half-pressed by the user and the imaging preparation operation is performed.

In a case where the user fully presses the shutter button 61 in step S2000 to turn on the SW2 signal, the flow proceeds to step S2001. In step S2001, the camera control unit 50 determines whether or not the shutter speed (referred to as SS hereinafter) set by user operation or AE processing is lower than a predetermined value, in other words, whether or not the exposure period is longer than a predetermined period. Now assume that the predetermined value (predetermined period) is 1/60 seconds.

Generally, SS is set to be high in an attempt to suppress image blur caused by camera shake or motion blur of a quickly moving object, and is set to be low in an attempt to ensure a light amount in a dark place or in an attempt to smoothly capture a water surface. More specifically, SS can be set in a wide speed range, from a high speed (such as 1/4000 seconds) that the user perceives as an instant to a low speed (such as 10 seconds or 30 seconds) for long exposure.

It is said that if a time interval between two vibration stimuli is very short, a person perceives them as a single vibration, in other words, cannot distinguish the two vibrations. Therefore, in a case where the mechanical shutter operates at a high shutter speed, even if the two light shielding curtains, the front curtain and the rear curtain, vibrate twice during their running, the user perceive them as a single vibration. On the other hand, during long exposure, the user can recognize two vibrations at the start and end of the exposure. Accordingly, this embodiment changes the number of vibrations and timings of the vibration device 100 according to SS during imaging using the electronic shutter.

In a case where SS is lower than 1/60 seconds in step S2001 (SS>1/60), the flow proceeds to S2002 and the camera control unit 50 causes the vibration device 100 to generate first vibration before the exposure starts. Next, in step S2003, the camera control unit 50 causes the image sensor 22 to operate the electronic front curtain to start the exposure, and in a case where the exposure period elapses, the camera control unit 50 causes the image sensor 22 to operate the electronic rear curtain to end the exposure. Next, in step S2004, the camera control unit 50 reads out the imaging signal from the image sensor 22. After the camera control unit 50 finishes the readout, the camera control unit 50 causes the vibration device 100 to generate second vibration in step S2005 and finishes the imaging processing.

Figure 5A:
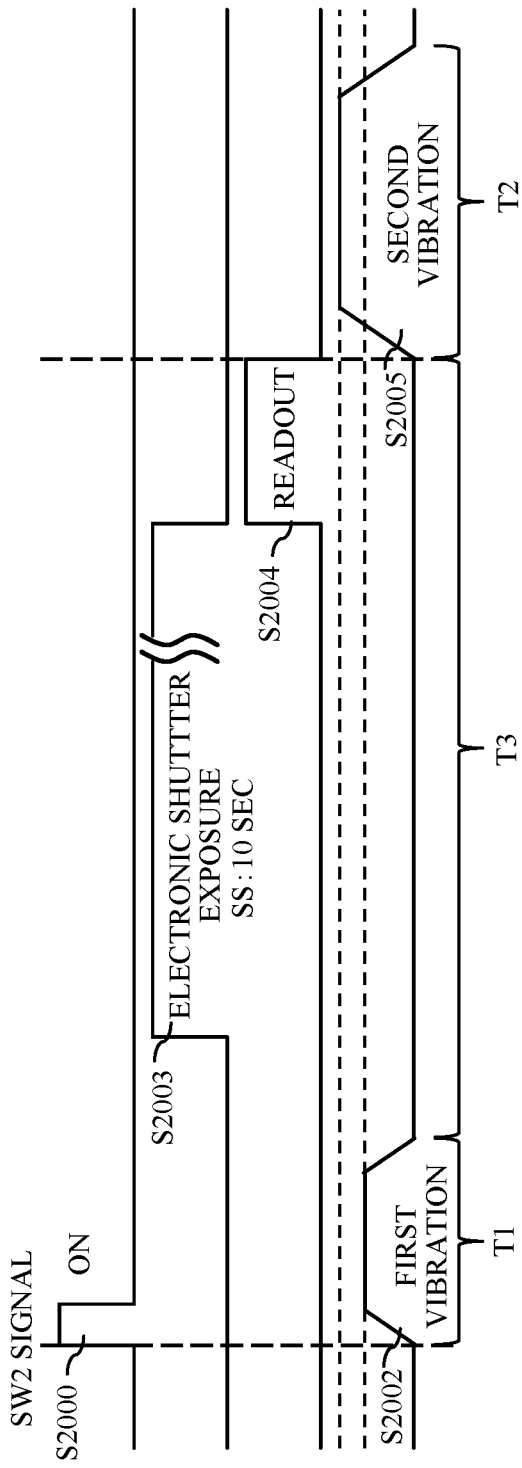
FIGS. 5A and 5B are timing charts according to the imaging processing.

FIG. 5A illustrates the timings of the exposure start and end and vibration generation in the long exposure with SS of 1/60 second or lower. Each timing in FIG. 5A is labeled with a corresponding step number in FIG. 4. In FIG. 5A, SS is set to 10 seconds as an example.

In a case where the SW2 signal turns on (step S2000), the first vibration occurs before the exposure starts (step S2002). After that, after the first vibration converges (stops), the exposure by the electronic shutter is started (step S2003). Since the vibration device 100 does not generate vibration in the exposure period, the influence of the vibration on the exposure (image blur) can be avoided.

In the long exposure, the user needs to keep a still posture while concentrating on maintaining the composition in order to prevent camera shake, and thus the user is less likely to notice operational errors. For example, in a case where the user fails to operate the shutter button 61, the user may wait for several seconds without noticing the mistake. The first vibration is effective in informing the user that imaging (exposure) has definitely started.

In a case where the exposure ends and the readout of the imaging signal from the image sensor 22 (step S2004) ends, the second vibration occurs (step S2005) to inform the user of the end of imaging. As described above, during the long exposure, the user maintains a still posture while concentrating on maintaining the composition. Therefore, even if a weak and short vibration occurs at the timing of step S2005, the user may not notice the vibration. In addition, after the end of imaging, even if a strong vibration is generated, the image quality of the captured image is not negatively affected. Therefore, in this embodiment, the second vibration is stronger (vibration with larger acceleration or amplitude) than the first vibration, and a vibration duration (period) T2 is longer than a vibration duration (period) T1 of the first vibration. Thereby, the user can recognize the end of imaging without fail. In addition, by changing the vibration intensity and vibration duration, the user can easily distinguish the start and end of imaging.

On the other hand, in step S2001 of FIG. 4, if SS is a high speed equal to or less than the predetermined value (SS≤1/60), the flow proceeds to step S2006 and the camera control unit 50 causes the image sensor 22 to operate the electronic front curtain to start the exposure. After the exposure period elapses, the camera control unit 50 causes the image sensor 22 to perform the electronic rear curtain operation to end the exposure. Next, in step S2007, the camera control unit 50 reads out the imaging signal from the image sensor 22. Then, the camera control unit 50 causes the vibration device 100 to generate third vibration in step S2008 in this readout. Thereafter, the imaging processing ends.

In a case where SS is high, a period T3 between the first vibration and the second vibration illustrated in FIG. 5A becomes short and the user is likely to recognize the first and second vibrations as a single vibration. Since the vibration device 100 is an actuator that operates when energized, unlike the impact that occurs in a case where the light shielding curtain of the mechanical shutter runs, the response time from the energization start to the actual vibration generation is long. Therefore, in the case of the high SS, the first vibration and the second vibration are likely to be continuous, and the user may perceive them as single extended vibration.

Figure 5B:
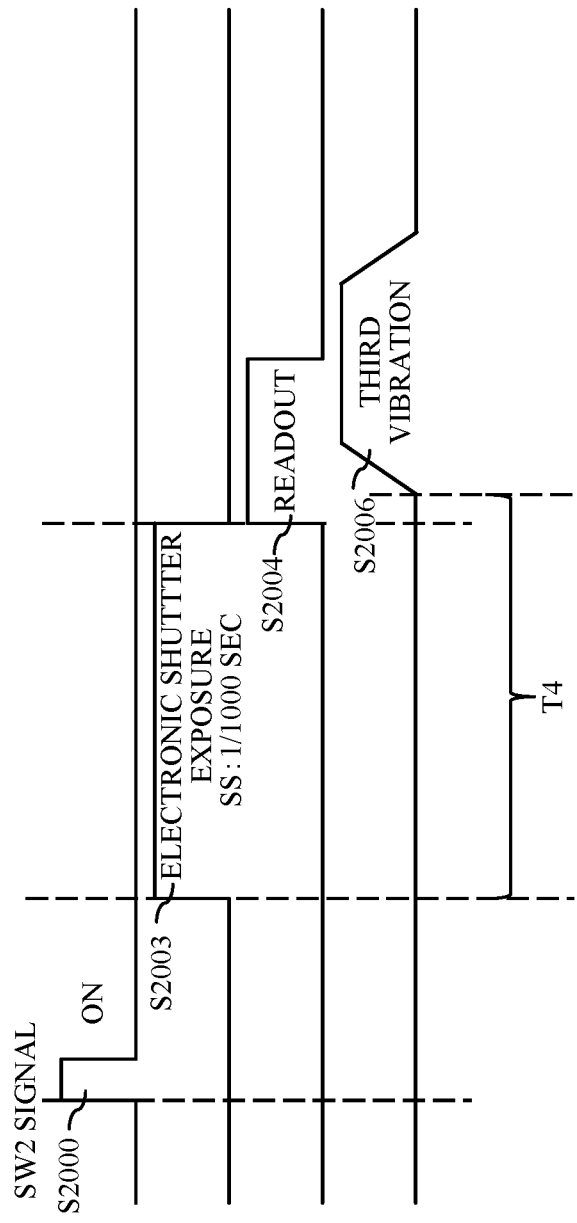

FIG. 5B illustrates the timings of exposure start and end and vibration generation in the high-speed exposure with SS of 1/60 second or higher. Each timing in FIG. 5B is labeled with a corresponding step number in FIG. 4. In FIG. 5B, SS is set to 1/1000 seconds as an example. High SS exposure is often used to capture a scene in which momentary imaging timing is considered important, such as imaging of a flying bird or a vigorously moving athlete.

Therefore, in a case where the SW2 signal is turned on (step S2000), the exposure (step S2006) and readout (step S2007) are performed similarly to normal imaging. Thereby, the user can capture an image with normal feeling. The third vibration is started during the readout. By making a period T4 between the exposure start timing and the generation timing of the third vibration as short as possible, the user can easily recognize the timing from the full-press operation of the shutter button 61 to the exposure. The third vibration may be generated during exposure to the extent that the influence on the image quality is permissible.

The third vibration may be stronger than each of the first vibration and the second vibration. The third vibration simulates a combination of two vibrations caused by moving the front and rear curtains of the mechanical shutter. By making the third vibration stronger than each of the first vibration simulating the vibration of moving the front curtain and the second vibration simulating the vibration of moving the rear curtain, the third vibration can be closer to the vibration generated by the mechanical shutter. The frequency and vibration duration of the third vibration may be made different from at least one of the first and second vibrations.

The predetermined value (predetermined period) in step S2001 may be any value. The predetermined value may be a user-selected value arbitrarily selected by the user in consideration of the sense of vibration of the user and a main object. The predetermined value may be changed according to an imaging mode. For example, in the manual mode and the shutter speed priority mode, the number of vibrations is changed according to the shutter speed as illustrated in FIG. 5A, and the vibration intensity and vibration duration are changed. In the automatic mode and F-number priority mode, the vibration may be fixed to single vibration as illustrated in FIG. 5B. In the manual mode and the shutter speed priority mode, the user selects the shutter speed by himself, so the number of vibrations and the like may be changed accordingly so as to provide the user with a vibration notification function suitable for the intent of the user. On the other hand, in the automatic mode and the F-number priority mode, the shutter speed may be automatically adjusted according to the ambient light, and the vibration notification timing may be frequently changed. Thus, it is preferable to fix the number of vibrations to one because it does not confuse the user.

In this embodiment, the image pickup apparatus is a single digital camera, but this embodiment is also applicable to an image pickup apparatus as a camera unit in various electronic apparatuses such as personal computers, game machines, mobile phones, and tablet terminals.

This embodiment can provide an image pickup apparatus that includes an electronic shutter having an electronic front curtain operation and an electronic rear curtain operation, a control method, a control apparatus, and a storage medium, each of which enables a user to recognize the start and end of long exposure (electronic charge accumulation) by the vibration of a vibration device.

According to the above embodiment, in an image pickup apparatus using an electronic shutter including an electronic front curtain operation and an electronic rear curtain operation, the start and end of exposure (charge accumulation) of the image sensor during long-time imaging are controlled by the vibration generated by the vibration device.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-064169, filed on Apr. 7, 2022, which is hereby incorporated by reference herein in its entirety.

What is claimed is:

1. An image pickup apparatus comprising:
an image sensor configured to receive light and accumulate charges;
a vibration generator configured to generate vibration;
at least one processor; and
a memory coupled to the at least one processor,
wherein the memory has instructions that, when executed by the processor, configure the processor to operate as:
an image sensor control unit configured to cause the image sensor to perform an electronic front curtain operation to start accumulating the charges, and to perform an electronic rear curtain operation to finish accumulating the charges; and
a vibration control unit configured to control the vibration generator,
wherein the vibration control unit causes the vibration generator to generate first vibration before accumulating the charges is started and second vibration after the accumulating the charges are finished.

2. The image pickup apparatus according to claim 1, wherein in a case where a charge accumulating period is longer than a predetermined period, the vibration control unit causes the vibration generator to generate the first vibration and the second vibration, and
wherein in a case where the charge accumulating period is shorter than the predetermined period, the vibration control unit causes the vibration generator to generate third vibration instead of the first and second vibrations.

3. The image pickup apparatus according to claim 2, wherein the vibration control unit causes the vibration generator to generate the third vibration during readout of accumulated charges.

4. The image pickup apparatus according to claim 2, wherein the third vibration is vibration in which at least one of acceleration and amplitude is larger than that of each of the first vibration and the second vibration.

5. The image pickup apparatus according to claim 2, wherein the third vibration is vibration that is different in at least one of frequency and duration from at least one of the first vibration and the second vibration.

6. The image pickup apparatus according to claim 2, wherein the vibration control unit changes the predetermined period according to selection by a user.

7. The image pickup apparatus according to claim 2, wherein the vibration control unit changes the predetermined period according to an imaging mode.

8. The image pickup apparatus according to claim 1, wherein the second vibration is vibration in which at least one of acceleration and amplitude is larger than that of the first vibration.

9. The image pickup apparatus according to claim 1, wherein the second vibration has a duration longer than that of the first vibration.

10. A control method for an image pickup apparatus that includes an image sensor configured to receive light and accumulate charges, and a vibration generator configured to generate vibration, the control method comprising the steps of:

causing the image sensor to perform an electronic front curtain operation to start accumulating the charges, and to perform an electronic rear curtain operation to finish accumulating the charges; and causing the vibration generator to generate first vibration before accumulating the charges is started and second vibration after the accumulating the charges are finished.

11. A non-transitory computer-readable storage medium storing a program that causes a computer to execute the control method according to claim 10.

12. A control apparatus for an image pickup apparatus that includes an image sensor configured to perform an electronic front curtain operation to start accumulating the charges, and an electronic rear curtain operation to finish accumulating the charges, and a vibration generator configured to generate vibration, the control apparatus comprising:
at least one processor; and
a memory coupled to the at least one processor,
wherein the memory has instructions that, when executed by the processor, configure the processor to operate as:
a vibration control unit configured to control the vibration generator,
wherein the vibration control unit causes the vibration generator to generate first vibration before the image sensor starts accumulating the charges and second vibration after the image sensor finishes accumulating the charges.

13. The control apparatus according to claim 12, wherein the vibration control unit causes the vibration generator to generate the second vibration after readout of accumulated charges is finished.

14. The control apparatus according to claim 12, wherein the vibration control unit causes the vibration generator to generate the first vibration so that the first vibration stops before the image sensor starts accumulating the charges.

* * * * *